3,220,585
HIGH LIFT TRAILER
Duane N. McCartney, Pebble Beach, and Victor H. Carder, Pacific Grove, Calif., assignors to Cochran Equipment Company, Salinas, Calif., a corporation of California
Filed June 3, 1963, Ser. No. 286,885
4 Claims. (Cl. 214—512)

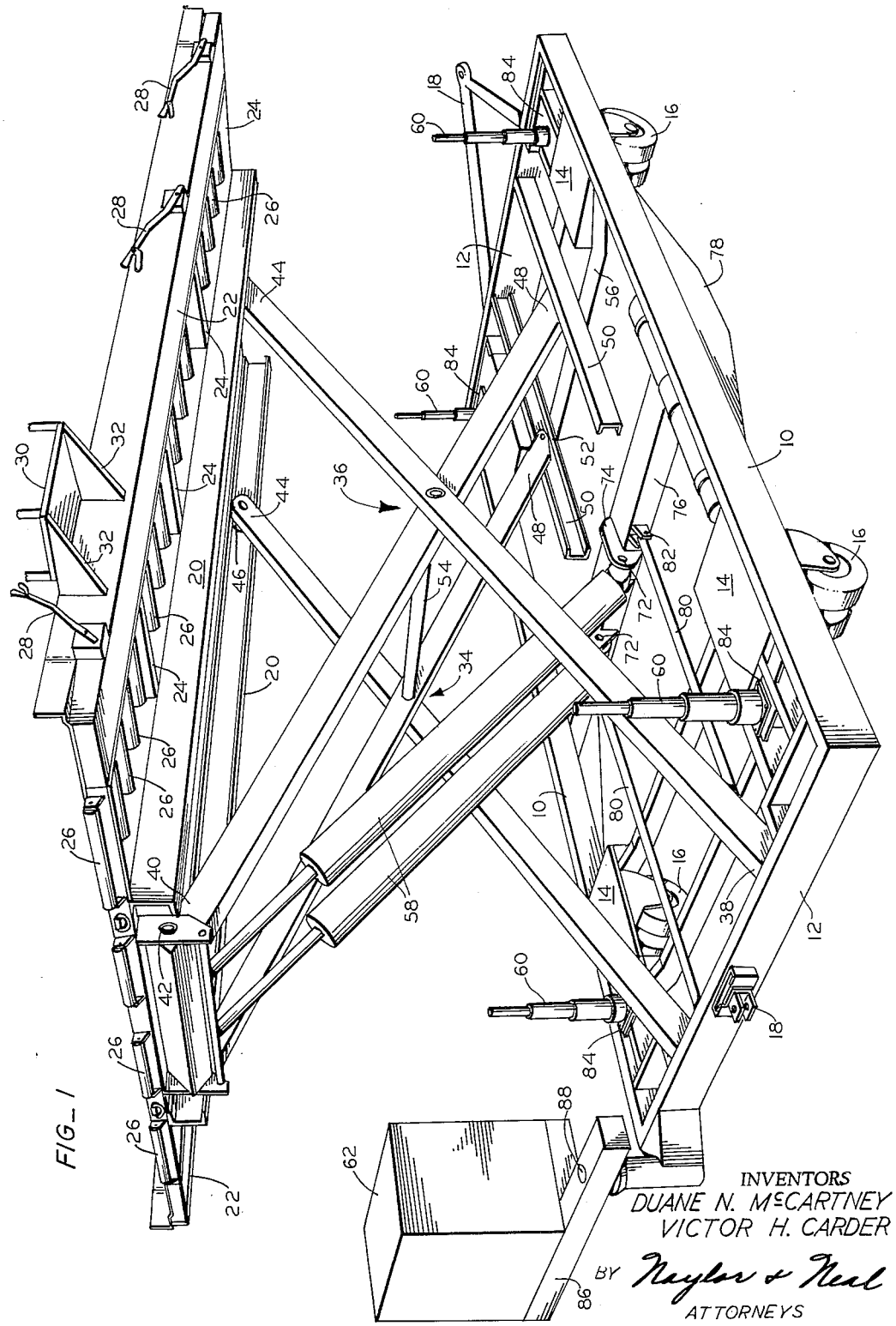

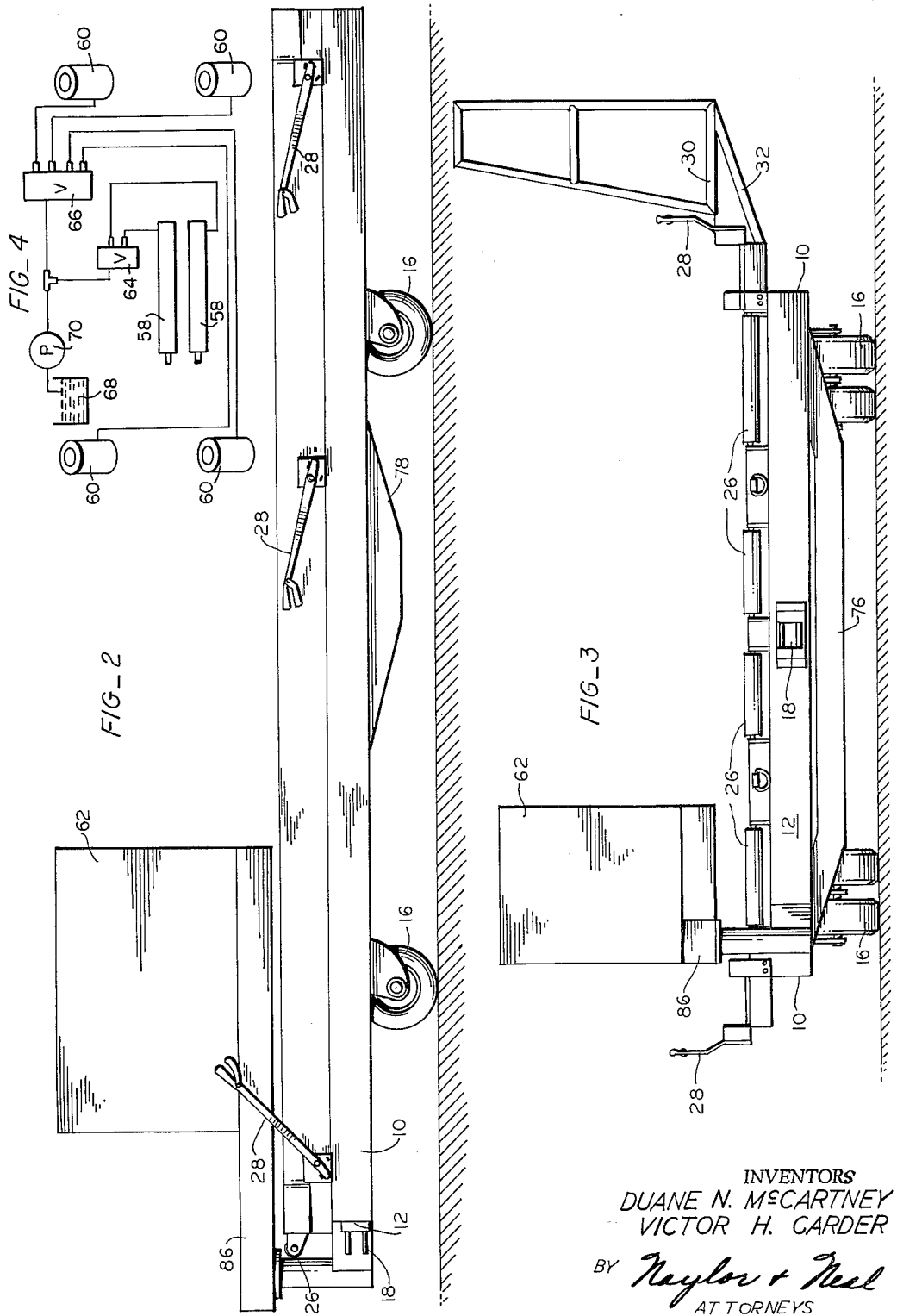

This invention relates to material handling apparatus and more particularly to a portable elevator for loading cargo on aircraft and the like.

In a copending application of Thomas Herrmann, Serial Number 140,516, filed September 25, 1961, now Patent No. 3,164,274, there is disclosed a high lift trailer for facilitating the loading of freight pallets in aircraft. The present invention relates to improvements in that trailer which facilitate an improved manner of operation of the trailer.

As pointed out in the above identified copending application, it is desirable in the construction of a high lift trailer of this type to provide a trailer with minimum overhead in its lower position so that cargo may be transferred thereto at a level closely adjacent to the ground, but the trailer must be able to lift loads through a substantial height so that cargo may be lifted from the low overhead position to the elevation of a cargo hatch in an aircraft fuselage. Because of the high lifting dimension of the trailer, a very stable lifting mechanism must be used, and a scissors lift mechanism such as that shown in the above identified copending application provides an ideal lifting mechanism for this purpose. However, the use of a scissors lift mechanism also provides design difficulties in the trailer because of the low overhead dimension of the trailer in its lowered position; the scissors lift arms, in the lowered position, becomes substantially parallel to each other and provide very little clearance underneath the elevatable frame so that it is difficult to provide in the low overhead clearance of the trailer any long stroke lifting rams having a sufficiently effective angle of operation to provide lifting capacity for heavy loads when the upper frame is lowered.

In the apparatus shown in the copending application, an effective angle of application of the lifting rams is obtained by providing an upward protrusion at one end of the trailer into which the upper ends of the rams extend to permit the longitudinal axes of the rams to be inclined by a substantial angle to a horizontal plane when the rams are fully contracted. The solution to the problem is very satisfactory where the upward protrusion is located at one end of the trailer and the trailer is to be employed for moving loads transversely from one of its sides to the other; however, where it is desirable to move loads longitudinally of the trailer, delivering them to the trailer at one end and delivering them from the trailer at the other end, the upward protrusion on the chassis interferes substantially with the operation of the trailer because it prevents movement of loads onto and off of the trailer at ground level at one end. While many applications of the high lift trailer provide for movement of loads transversely across the trailer, it is very desirable in some instances to permit longitudinal movements of the loads since, for instance, with some aircraft it is easier to position the trailer in alignment with the cargo door where the trailer can be pushed or towed in a straight line toward the door.

It is an object of this invention to provide a low overhead high lift apparatus of this type in which the load conveying means on top of the upper frame substantially completely covers the lower frame of the apparatus so that the conveying means may be adapted for both longitudinal and transverse movement of cargo.

It is another object of the invention to provide such a low overhead high lift device having primary and auxiliary lifting means both received in the low overhead space of the apparatus where the primary lifting means is effective for lifting loads to high elevations, and the auxiliary lifting means is effective for lifting loads to sufficient intermediate heights that the primary lifting means may become effective.

It is another object of the invention to provide such a low overhead high lift device with which loads can be supported in a horizontal position at substantially all elevations of the lifting apparatus.

It is another object of the invention to provide a high lift trailer of this type having movable support means for its power plant so that the power means for supplying hydraulic fluid and the like to the rams may be moved between a retracted position over the load carrying bed of the trailer for providing compact dimensions of the trailer and alternative projected positions in which it permits free lifting of the load carrying bed and delivery of cargo to all sides of the lifting bed.

Other objects and advantages of the invention will become apparent from the following description read in conjunction with the attached drawings in which:

FIG. 1 is a perspective view of a low overhead high lift trailer constructed in accordance with the principles of this invention with the trailer being illustrated in partially elevated condition and with its power plan in one of its projected positions;

FIGS. 2 and 3 are side and end elevational views respectively of the trailer of FIG. 1 showing the trailer in fully collapsed condition and with its power plant retracted, and FIG. 4 is a schematic diagram of the hydraulic system employed in the trailer of FIG. 1.

Referring now in detail to the drawings and particularly to FIG. 1, the high lift trailer illustrated therein includes a chassis having chassis side frame members 10 and end frame members 12 which support wheel wells 14 and ground engaging wheels 16. Trailer hitch members 18 are provided on the front and rear frame members 12 for permitting towing of the trailer in a predetermined direction parallel to the side frame members 10.

An upper load carrying bed is provided with an upper conveyor surface substantially coextensive with the plan area of the chassis, the bed being mounted on a pair of longitudinal channel members 20 with the bed having longitudinal and lateral frame members 22 and 24 respectively which together define a lattice for supporting a plurality of anti-friction rollers 26. The rollers are here indicated as being arranged for conveying cargo longitudinally of the trailer but are adapted for rearrangement to convey cargo transversely of the trailer. In this regard, the rollers 26 are mounted on axles (not shown) which are removably received in apertures in the longitudinal frame members 22 of the bed and a second set of apertures (not shown) are provided in the transverse frame members 24 of the bed for mounting the rollers 26 for conveying cargo transversely of the bed. Where it is desirable to permit rapid conversion between longitudinal and transverse conveying conditions, the rollers 26 may be mounted in modules which may be rotated 90° in the spaces between longitudinal and transverse frame members 22 and 24 of the bed. A plurality of operating handles 28 are mounted on the bed for manipulating suitable latch members (not shown) which latch pallets of cargo in predetermined positions on the bed during raising and lowering of the bed. Additionally, an operator's platform 30 is mounted on one side of the bed on brackets 32 to provide a station for an operator when raising and lowering cargo, and means (not shown) are provided for removing the platform 30 and relocating it on one end of the bed when the bed is adjusted to transport cargo transversely thereof.

The load carrying bed is mounted on the chassis to be maintained parallel to the chassis by two pairs of scissors lift arms 34 and 36 where each pair of arms has a lower arm end 38 pivotally connected to the chassis and upper arm end 40 pivotally connected to the bed at a pivot tube 42, an upper arm end 44 which slidably engages one of the channels 20 by means of a flanged wheel 46 received in the channel 20, and a lower arm end 48 slidably engaging a longitudinal channel 50 on the chassis by means of a flanged wheel 52 mounted thereon. The scissors arms are pivotally connected together at their midpoints at a pivot shaft 54, and the inner arm of each pair is spaced inwardly from the outer arm by a spacer (not shown) which is of a width at least as great as the widths of the channels 50 and which permits the scissors arms of each pair to assume a position parallel to each other when the bed is fully lowered. In this fully lowered position, the frame members of the bed rest upon the frame members of the chassis, and the scissors arms, the channels 20, and the channels 50 lie in substantially the same plane. It should be noted that an auxiliary frame support 56 extends transversely between the side frame members 10 underneath the channels 50 to provide sufficient support for the channels 50 that they may carry the load of the scissors arms throughout the various positions of elevation of the bed.

The lifting thrust for raising the bed above the chassis while the bed is maintained in horizontal position by the scissors arms is provided by primary hydraulic rams 58 and secondary hydraulic rams 60 which are connected to a power unit 62 through distributing valves 64 and 66 respectievly (see FIG. 4). The power unit contains a reservoir 68 of hydraulic fluid, a pump 70, and a motor (not shown) which drives the pump 70 and which may be controlled by electrical switches. The electrical control switches are mounted on the end of a long flexible cable which may be held by an operator standing on platform 30 while controlling the raising and lowering of the bed. The primary rams 58 are pivotally connected at their upper ends to the pivot tube 42 and are pivotally connected at their lower ends at pivot pin 72 on brackets 74 which are in turn mounted on a transverse crossbrace 76 slightly below the level of channels 50. The cross-brace 76 is supported on the side frame members 10 by means of supports 78, and tension rods 80 are connected between the rear frame member 12 and brackets 82 on the transverse brace 76 for supporting the brace 76 against longitudinal stresses imparted thereto by the primary rams 58.

The auxiliary rams 60 are mounted in brackets 84 in the chassis adjacent to the four corners of the chassis and positioned to engage the longitudinal frame members 22 of the bed when the bed is lowered to a position approaching the chassis.

The power unit 62 is mounted on a support frame 86 which is pivotally mounted on a pivot pin 88 which is supported on one corner of the chassis frame members so that the power unit 62 may be swung from a position over the load carrying bed when the bed is in its lowered position as shown in FIGS. 2 and 3 to alternative positions outboard of the bed either to the side as shown in FIG. 1 or to the rear of the bed when the conveyor rollers 26 on the bed are arranged for traverse movement of loads.

When an operator standing on platform 30 actuates the controls for power unit 26 to supply hydraulic fluid to the rams 58 and 60 while the bed is in its lower position, the hydraulic fluid supplied to auxiliary rams 60 lifts the load carrying bed to a sufficient intermediate height that effective angle for application of thrust from the primary rams 58 to the load carrying bed is sufficiently great that the primary rams take over and lift the bed away from the secondary rams 60 and upwardly toward the high lift position. The porportioning valve 66 which distributes fluid to the four auxiliary rams 60 provides synchronous lifting of the four corners of the bed at low elevations so that the bed is maintained parallel to the chassis at all times. In this regard, synchronization of lifting during the auxiliary lifting period before the primary rams take over is important and should be provided where best operation is desired even when other primary and secondarly lifting means are employed such as primary lifting means pulling the ends 48 of the scissors arms toward the ends 38 with cam actuated secondary lift means for raising the corners of the bed during initial movement of the ends 48 toward the ends 38. Additionally, the distributing valve 64 which supplies equal volumes of hydraulic fluid to the two primary rams 58 is very useful in augmenting the stability of the trailer in its high lift condition.

The low overhead high lift trailer constructed in accordance with the principles of this invention is very well adapted for the uses mentioned above for loading cargo on aircraft and the like. The particular trailer illustrated in the drawings is shown to scale and is constructed with a minimum overhead (lowered height exclusive of the platform 30) of 20 inches with a maximum raised height (exclusive of the platform) of 146 inches, the trailer having a width exclusive of the platform of 96 inches, a length of 200 inches and a load lifting capacity of 10,000 pounds.

While one specific embodiment of the invention has been illustrated and described in detail herein, it is obvious that many modifications thereof may be made without departing from the spirit and scope of the invention.

We claim:

1. A low overhead, high lift, elevator which comprises, upper and lower frames; scissors lift arms interconnecting said frames for maintaining said frames generally parallel to each other while permitting said frames to move between a high lift position with said frames remote from each other and a low overhead position with said frames closely adjacent to each other; and fluid ram means for moving said frames between said positions which comprises primary ram means positioned between said frames and generally parallel to said arms when said frames are in said low overhead position, two pairs of auxiliary ram means with the rams of each pair mounted on one of said frames adjacent to one end of said scissors lift means and on opposite sides of said scissors lift means for vertical expansion toward the other of said frames responsive to the delivery of pressurized fluid thereto to move said frames from said low overhead position to an intermediate position between said low overhead and high lift positions while preventing lateral and longitudinal pitching of said upper frame with respect to said lower frame, and fluid pressure supply means connected to said primary and auxiliary ram means.

2. A low overhead high lift vehicle for loading cargo on an aircraft or the like which comprises a chassis having ground engaging wheels thereon and chassis frame members defining a generally rectangular plan of said chassis, an upper frame mounted on said chassis immediately on top of said chassis frame members with said upper frame having conveyor means thereon substantially coextensive with the rectangular plan of said chassis and adapted to convey cargo thereover, receiving cargo at any one of its four sides and discharging it at its opposite side, scissors lift means between said chassis and frame for maintaining said frame parallel to said chassis while permitting said frame to be moved to a high lift position substantially above said chassis, lift means including ram means mounted between said chassis and said frame for raising said frame to said high lift position responsive to the delivery of pressurized fluid to said ram means, said lift means having secondary lift means for lifting said upper frame to an intermediate position below said high lift position and primary lift means for lifting said frame from said intermediate position to said high lift position independently of said secondary lift means, power means connected to said ram means for supplying pressurized fluid to said ram means, and support means pivotally mounting said power means on said chassis at one corner of the rectangular plan of said chassis for swinging movement about a vertical axis between a retracted position over said upper frame when said upper frame is lowered and a pair of alternative projected positions spaced laterally from said upper frame adjacent to the two sides of said chassis plan which meet at said corner.

3. A low overhead high lift trailer which comprises a chassis having ground engaging wheels thereon and chassis frame members spaced closely adjacent to the level of the ground which said wheels engage, a load carrying bed positioned immediately on top of said chassis frame members, a pair of longitudinal channel members mounted on said chassis and a pair of longitudinal channel members mounted on said bed with the channel members of said pairs lying in substantially the same plane underneath said bed, two pairs of scissors lift arms with each pair of arms having four end portions with one end portion pivotally connected to each of said chassis and said bed and with one of the other two of said end portions slidably engaging a channel of each of said pairs, primary ram means positioned between said pairs of scissors lift arms and having opposite ends pivotally connected to said bed and chassis for pushing said bed and chassis apart responsive to the delivery of pressurized fluid thereto, said ends of said ram means lying closely adjacent to said plane, auxiliary ram means mounted on said chassis underneath said bed for upward expansion responsive to the delivery of pressurized fluid thereto to lift said bed above said chassis with said auxiliary ram means having an expanded dimension substantially less than the expanded dimension of said primary ram means, fluid pressure supply means connected to said primary and auxiliary ram means and movable support means mounting said fluid pressure supply means on said chassis for movement between a retracted position over said bed when said bed is adjacent to said chassis and a projected position spaced laterally from said bed.

4. A movable conveyor for cargo which comprises a chassis having ground engaging wheels thereon an upper frame covering substantially the complete area of said chassis with conveyor means on said upper frame for conveying cargo thereover, receiving cargo at one side thereof and discharging said cargo from the opposite side thereof, lift means between said upper frame and chassis for lifting said upper frame above said chassis, said lift means including ram means for lifting said frame above said chassis responsive to the delivery of pressurized fluid to said ram means, power means connected to said ram means for supplying pressurized fluid to said ram means, and movable support means mounting said power means on said chassis for movement between a retracted position over said upper frame when said upper frame is lowered and a projected position spaced laterally from said upper frame.

References Cited by the Examiner
UNITED STATES PATENTS

| | | | |
|---|---|---|---|
| 1,985,169 | 12/1934 | Howell et al. | 214—512 X |
| 2,379,094 | 6/1945 | Maxon | 214—512 X |
| 2,471,901 | 5/1949 | Ross | 254—9.6 |
| 2,617,547 | 11/1952 | Pridy | 214—512 X |
| 2,714,967 | 8/1955 | Olsen | 214—84 X |
| 2,764,869 | 10/1956 | Scherr | 214—512 X |
| 2,789,234 | 4/1957 | Lambert et al. | 105—133 |
| 2,829,863 | 4/1958 | Gibson | 254—8.6 |
| 2,935,218 | 5/1960 | Fritz | 214—512 |
| 3,042,228 | 7/1962 | Frangos. | |

HUGO O. SCHULZ, *Primary Examiner.*

GERALD M. FORLENZA, *Examiner.*